US012570048B2

(12) United States Patent
Harvey et al.

(10) Patent No.: US 12,570,048 B2
(45) Date of Patent: Mar. 10, 2026

(54) MANUFACTURING 3D PRINTED OBJECTS

(71) Applicant: PERIDOT PRINT LLC, Palo Alto, CA (US)

(72) Inventors: Natalie Laura Harvey, Sant Cugat del Valles (ES); Xavier Gasso Puchal, Sant Cugat del Valles (ES); Arnau Mestres Rosas, Sant Cugat del Valles (ES); Ariadna Marin Camara, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 261 days.

(21) Appl. No.: 18/282,972

(22) PCT Filed: Mar. 29, 2021

(86) PCT No.: PCT/US2021/024574
§ 371 (c)(1),
(2) Date: Sep. 19, 2023

(87) PCT Pub. No.: WO2022/211775
PCT Pub. Date: Oct. 6, 2022

(65) Prior Publication Data
US 2025/0276491 A1     Sep. 4, 2025

(51) Int. Cl.
*B29C 64/30* (2017.01)
*B29C 64/153* (2017.01)
(Continued)

(52) U.S. Cl.
CPC ............ *B29C 64/30* (2017.08); *B29C 64/153* (2017.08); *B29C 71/0009* (2013.01);
(Continued)

(58) Field of Classification Search
CPC ... B29C 64/30; B29C 64/153; B29C 71/0009; B33Y 10/00; B33Y 40/20; C08J 7/02; C08J 2377/00; C09D 177/00; B29K 2077/00
See application file for complete search history.

(56) References Cited

U.S. PATENT DOCUMENTS 6,323,256 B1 * 11/2001 DelMain .................... C08J 7/02
                                                        523/105
12,369,595 B2 * 7/2025 Bowden ................. B65G 67/02
(Continued)

FOREIGN PATENT DOCUMENTS

CN            112060580 A     12/2020
EP             3587092 A1      1/2020
(Continued)

OTHER PUBLICATIONS

Crane, N.B., et al., "Impact of chemical finishing on laser-sintered nylon 12 materials," Additive Manufacturing, vol. 13, Jan. 2017, pp. 149-155.

(Continued)

*Primary Examiner* — Nahida Sultana
(74) *Attorney, Agent, or Firm* — Dierker & Kavanaugh, P.C.

(57) ABSTRACT

The present disclosure relates a method of chemical polishing a 3D printed object. The method comprises treating a 3D printed object with solvent to reduce the surface roughness of the 3D printed object, and controlling the Youngs modulus of the 3D printed object within a target value by selectively removing at least part of the solvent from the 3D printed object.

12 Claims, 2 Drawing Sheets

(51) Int. Cl.

| | |
|---|---|
| *B29C 71/00* | (2006.01) |
| *B29K 77/00* | (2006.01) |
| *B33Y 10/00* | (2015.01) |
| *B33Y 40/20* | (2020.01) |
| *C08J 7/02* | (2006.01) |
| *C09D 177/00* | (2006.01) |

(52) U.S. Cl.
CPC ............... *B33Y 10/00* (2014.12); *B33Y 40/20* (2020.01); *C08J 7/02* (2013.01); *C09D 177/00* (2013.01); *B29K 2077/00* (2013.01); *C08J 2377/00* (2013.01)

(56) References Cited

U.S. PATENT DOCUMENTS

| | | | | |
|---|---|---|---|---|
| 12,472,574 | B2 * | 11/2025 | Largiller | B23K 35/262 |
| 2014/0248500 | A1 * | 9/2014 | Yoshida | C08J 7/043 |
| | | | | 427/372.2 |
| 2017/0014911 | A1 * | 1/2017 | Ng | B22F 1/10 |

| | | | | |
|---|---|---|---|---|
| 2018/0104894 | A1 * | 4/2018 | Fung | C08K 3/04 |
| 2019/0046696 | A1 | 2/2019 | Parikh et al. | |
| 2019/0375158 | A1 | 12/2019 | Crabtree et al. | |

FOREIGN PATENT DOCUMENTS

| | | |
|---|---|---|
| EP | 3597402 A1 | 1/2020 |
| JP | 2020-122249 A | 8/2020 |
| WO | 03/89218 A1 | 10/2003 |
| WO | 2018/080631 A1 | 5/2018 |
| WO | 2018/127683 A1 | 7/2018 |
| WO | 2019/201932 A1 | 10/2019 |
| WO | 2020/049186 A1 | 3/2020 |
| WO | 2020/160077 A1 | 8/2020 |
| WO | 2020/251520 A1 | 12/2020 |

OTHER PUBLICATIONS

Additive Manufacturing Technologies, "Postpro3D: Automated Finishing for HP Multi Jet Fusion Technology," 2015-2018, 10 pages.

* cited by examiner

MANUFACTURING 3D PRINTED OBJECTS

BACKGROUND

Three-dimensional (3D) printing is an additive printing process used to make three-dimensional solid objects from a digital model. 3D printing techniques may be considered additive processes because they can involve the application of successive layers of material.

In some instances, an outer surface of a 3D printed object may have a surface roughness that is characteristic of its method of manufacture.

BRIEF DESCRIPTION OF DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
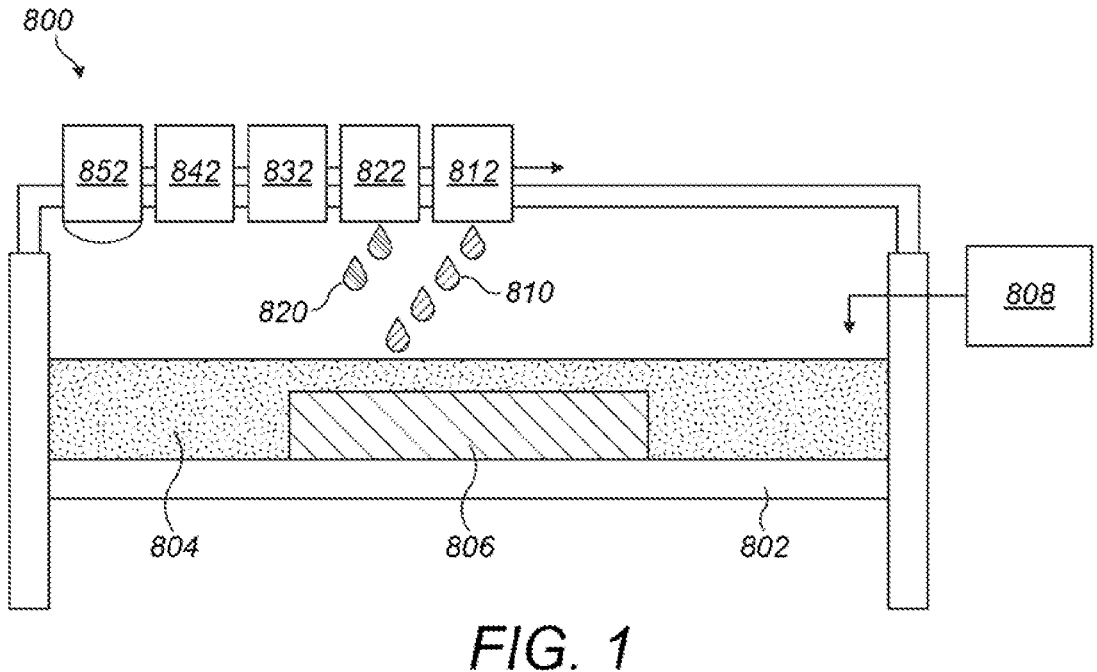
FIGS. 1 to 3 are schematic views of an example 3D printing system that can be used to print a 3D printed object.

The present disclosure relates a method of chemical polishing a 3D printed object. The method comprises treating a 3D printed object with solvent to reduce the surface roughness of the 3D printed object, and controlling the Young's modulus of the 3D printed object within a target value by selectively removing at least part of the solvent from the 3D printed object.

The present disclosure also relates to a 3D printed object obtainable according to the method of the present disclosure.

In a 3D printing process, a 3D object may be formed from a powder bed material. For example, particles of the powder bed material may be coalesced to form a layer of a 3D printed object. In some instances, a fusing agent comprising a radiation absorber in a liquid carrier may be selectively applied to regions of the powder bed material. When the radiation absorber is exposed to, for example, particular wavelengths of electromagnetic radiation, the radiation absorber may absorb the electromagnetic radiation and generate thermal energy. The thermal energy generated may cause powder bed material in contact with the radiation absorber to coalesce, thereby forming a layer of the 3D printed object.

The mechanical properties of the 3D printed object may depend on a number of factors, including, for example, the nature of the powder bed material and/or the design of the 3D printed object. To alter the mechanical properties of the 3D printed object, therefore, the powder bed material may be varied. Alternatively, the printing protocol of the 3D printed object may be re-designed.

It has been now found that the mechanical properties of the 3D printed object may also be varied by a post-printing procedure. For example, once the 3D printed object is formed, the 3D printed object may be treated with solvent to reduce the surface roughness of the 3D printed object. It has been found that the Young's modulus of the 3D printed part may be controlled by selectively removing at least part of the solvent from the 3D printed object. This allows the mechanical properties of the 3D printed object to be varied without, in some instances, necessarily having to resort to a different powder bed material and/or a print protocol re-design.

In some instances, the Young's modulus of the 3D printed object may be decreased by selectively removing the solvent, such that residual solvent in the 3D printed part is maintained above a threshold. As a result, the 3D printed object may be less stiff at least in the portions treated with the solvent. In other instances, the Young's modulus of the 3D printed part may be increased by selectively removing the solvent, such that residual solvent in maintained below a threshold. As a result, the 3D printed object may be stiffer at least in the portions treated with the solvent. Alternatively or additionally, it may be possible to alter the Young's modulus of the 3D printed part by selectively removing the solvent under selected process conditions to vary the physical and/or chemical properties of the material of the 3D printed object. For example, the Young's modulus of the 3D object may be controlled within a target value by selectively removing at least part of the solvent from the 3D printed object by heating the 3D printed object and controlling the duration and/or the temperature of heating.

In some examples, the 3D printed object may be treated with solvent to reduce the surface roughness of the 3D printed object in a chamber. The Young's modulus of the 3D printed object may be controlled within the target value by selectively removing at least part of the solvent from the 3D printed object in the same chamber.

Prior to treatment, the 3D printed object may have a first Young's modulus. For example, as printed, the 3D printed object may have a first Young's modulus. The difference between the target Young's modulus and the first Young's modulus may be at least about 2%. In some examples, the difference between the target Young's modulus and the first Young's modulus may be at least about 3% for instance, at least about 4%, at least about 5% or at least about 6%. In some examples, the difference between the target Young's modulus and the first Young's modulus may be at least about 7% for instance, at least about 8% or at least about 10%. In some examples, the difference between the target Young's modulus and the first Young's modulus may be about 2 to about 20%, for instance, about 3 to about 18%, about 4 to about 15%. In some examples, the difference between the target Young's modulus and the first Young's modulus may be about 5 to about 10%.

In some instances, the target Young's modulus may be lower than the first Young's modulus. In other instances, the target Young's modulus may be higher than the first Young's modulus.

The Young's modulus of the 3D object may be controlled within a target value by selectively removing at least part of the solvent from the 3D printed object, such that the 3D printed object contains about 0 or 0.1 to about 10 mg/cm$^2$ of residual solvent. In some examples, the amount of residual solvent may be about 0.2 to about 5 mg/cm$^2$, for instance, about 0.5 to about 3 mg/cm$^2$ of residual solvent.

In some examples, the method further comprises applying a dye the 3D printed object. Without wishing to be bound by any theory, it may be possible to control penetration of the solvent during chemical polishing through the application of dye. This, in turn, may allow the Young's modulus to be controlled.

As discussed above, the method comprises treating a 3D printed object with solvent to reduce the surface roughness of the 3D printed object. Any suitable solvent may be used. For example, the solvent may be a chemical polishing solvent. Suitable solvents include at least one of ethanol, propanol, isopropanol, butanol glycol glycerol, benzyl alcohol, chlorobenzene, triethylene glycol, 2,2,2-trifluoroethanol, hexafluoroisopropanol. In one example, the solvent comprises hexafluoroisopropanol.

The 3D printed object may be treated with solvent to reduce the surface roughness of the 3D printed object to a less than 4 Ra (μm). In some examples, the 3D printed object may be treated with solvent to reduce the surface roughness of the 3D printed object to less than 3 Ra (μm), for instance, less than 2 Ra (μm) or less than 1 Ra (μm). The final surface roughness may be tailored depending on, for example, the end use of the 3D printed object. Alternatively, the final surface roughness may be tailored depending on, for example, the nature of the finish intended to be applied to the 3D printed object (e.g. paint or metallization).

The 3D printed object may comprise a polymer selected from styrene block copolymers, olefinic thermoplastic elastomers, thermoplastic vulcanizates, thermoplastic polyurethanes, thermoplastic copolyesters and thermoplastic polyamides.

The 3D printed object may comprise a radiation absorber. For example, the 3D printed object may comprise carbon black.

The 3D printed object may be produced by selectively applying a fusing agent to portions of a layer of powder bed material. The fusing agent may comprise a radiation absorber and a liquid carrier. The method may further comprise irradiating the selectively applied fusing agent to generate thermal energy to coalesce the powder bed material to form a layer of the 3D printed object.

The fusing agent may be selectively applied to facilitate treatment of the outer surface of the 3D printed object with solvent. Alternatively or additionally, a detailing agent may be selectively applied to facilitate treatment of the outer surface of the 3D printed object with solvent. For example, the fusing agent may be selectively applied to provide the 3D printed object with a microstructure, for instance, a porous microstructure at an outer surface of the 3D printed object. Alternatively or additionally, a detailing agent may be selectively applied to provide the 3D printed object with a microstructure, for instance, a porous microstructure at an outer surface of the 3D printed object. The porosity at the outer surface of the 3D printed object may facilitate penetration of the solvent. This may facilitate the reduction in surface roughness of the 3D printed object. Moreover, by tailoring the porosity, it may be possible to vary the extent to which solvent penetrates the surface of the 3D printed object, allowing the Young's modulus of the 3D printed object to be further controlled.

Treatment with Solvent

As discussed above, method comprises treating a 3D printed object with solvent to reduce the surface roughness of the 3D printed object.

Any suitable solvent may be employed. For example, a chemical polishing solvent may be used. Examples of suitable solvents include alcohols, amides and acids.

Where an alcohol is used, monovalent and/or polyvalent alcohols may be used. The alcohol may be substituted and/or unsubstituted. Suitable substituents include alkyl groups, for example, $C_1$ to $C_6$ alkyl groups or $C_1$ to $C_3$ alkyl groups. Other substituents include amino, carboxyl, carboxylic acid and halo groups. the alcohol may be aliphatic and/or aromatic. The alcohol may be halogenated, for example, fluorinated.

The alcohol may have 1 to 20 carbon atoms, for example, 2 to 15 carbon atoms or 2 to 12 carbon atoms. In some examples, the alcohol may have 2 to 10 carbon atoms or 3 to 8 carbon atoms.

The alcohol may be selected from ethanol, propanol (e.g. iso-propanol), butanol, benzyl alcohol, cresols (e.g. m-cresol), chlorobenzene, 2,2,2-trifluoroethanol, hexafluoroisopropanol and mixtures thereof. The alcohol may also be polyvalent, for example, selected from glycol, glycerol and triethylene glycol. In some examples, the alcohol may be hexafluoroisopropanol.

Where an acid is used as the solvent, the acid may be a carboxylic acid. The acid may comprise 1 to 20 carbon atoms, for example, 1 to 15 carbon atoms. An example may be formic acid. In some examples, the carboxylic acid may be halogenated, e.g. fluorinated. An example may be trifluoroacetic acid. Alternatively, inorganic acids, for example, sulfuric acid may be employed.

Where an amide is used as the solvent, the amide may be dimethylformamide.

The 3D printed object may be treated with the solvent using any suitable method. For example, the 3D printed object may be treated with the solvent using a chemical polishing procedure. The 3D printed object may be treated with liquid solvent. In one example, the 3D printed object may be immersed in the liquid solvent.

It may also be possible to contact the 3D printed object with the solvent in vapour form. For example, the solvent may be vaporized. The solvent vapour may then be condensed onto an outer surface of the 3D printed object. The condensed solvent may form a film on an outer surface of the 3D printed object. The condensed solvent may partially penetrate pores at the surface of the 3D printed object and dissolve some of the material at the treated surface of the 3D printed object. The resulting outer surface of the 3D printed object may have a reduced surface roughness.

Where the solvent is vaporized prior to contact with the 3D printed object, the solvent may be vaporized by heating the solvent. The solvent may be heated to temperatures of at least about 60 degrees C., for example, at least about 70 degrees C., at least about 80 degrees C., at least about 85 degrees C. or at least bout 90 degrees C. The solvent may be heated to temperatures of at least about 100 degrees C., for example, at least about 110 degrees C., at least about 120 degrees C., at least about 130 degrees C., at least about 140 degrees C. or at least about 150 degrees C. The solvent may be heated to temperatures of at most about 220 degrees C., for example, at most about 200 degrees C., at most about 180 degrees C., or at most about 160 degrees C. In some examples, the solvent may be heated at about 60 to about 220 degrees C., for instance, about 70 to about 200 degrees C., about 80 to about 180 degrees C. or about 85 to about 160 degrees C. In some examples, the solvent may be heated to about 90 to about 150 degrees C.

The solvent may be vaporized by heating under pressure. For example, the pressure may be at least about 0.2 MPa, for instance, at least about 0.3 MPa or at least about 0.4 MPa. In some examples, the pressure may be at most about 1.0 MPa, for instance, at most about 0.8 MPa or at most about 0.6 MPa. In some examples, the pressure may be about 0.2 to about 1.0 MPa, for instance, about 0.3 to about 0.8 MPa or about 0.4 to about 0.6 MPa. In some examples, the pressure may be about 0.4 to about 0.5 MPa.

In some examples, the solvent may be vaporized by heating to about 85 to about 160 degrees C. at pressures of about 0.4 to 0.5 MPa.

Where the solvent is vaporized prior to contact with the 3D printed object, solvent vaporization may be carried out in a vaporization chamber. Solvent vapour from the vaporization chamber may then be transferred to a separate chamber, where contact between the solvent vapour and the 3D printed object takes place. This separate chamber may be a chemical polishing chamber. The amount of solvent introduced into the chemical polishing chamber may be varied to control the surface roughness of the treated 3D printed object.

Solvent vapour from the vaporization chamber may be transferred to a separate chamber (e.g. chemical polishing chamber), where contact between the solvent vapour and the 3D printed object takes place. The pressure in the chemical polishing chamber may be lower than the pressure in the vaporization chamber. In some instances, the chemical polishing chamber may be at a pressure of less than about 0.01 MPa, for example, less than about 0.008 MPa, less than about 0.006 MPa, less than about 0.005 MPa, less than about 0.004 MPa or about 0.003 MPa prior to injection of solvent into the chamber. Solvent vapour may then be introduced to bring the pressure in the chemical polishing chamber to greater than 0.01 MPa, for example, greater than 0.02 MPa or greater than about 0.03 MPa. Solvent vapour may then be introduced to bring the pressure in the chemical polishing chamber to less than about 0.1 MPa, for example, less than about 0.09 MPa or less than about 0.08 MPa. In one example, solvent vapour may then be introduced to bring the pressure in the chemical polishing chamber to about 0.01 to about 0.1 MPa, for instance, about 0.02 to about 0.09 MPa or about 0.03 to about 0.08 MPa.

The temperature at which the solvent vapour is contacted with the 3D printed object may be about 30 to about 80 degrees, for instance, about 40 to about 65 degrees C.

The temperature and/or pressure at which the solvent is contacted with the 3D printed object may be controlled to control the thickness of the film that is formed on the 3D printed object. This, in turn, may control the eventual surface roughness of the treated 3D printed object. Where contact between the solvent vapour and the 3D printed object takes place in a chemical polishing chamber, the chemical polishing chamber may be provided with a cooler to control the temperature within the chamber.

The amount of solvent and/or duration of contact between the solvent and the 3D printed object may also be varied to control the surface roughness of the treated 3D printed object. For example, by increasing the residence time of the film on the 3D printed object, the surface roughness of the 3D printed object may be reduced. Similarly, by increasing the amount of solvent relative to the outer surface area of the 3D printed object, the surface roughness of the 3D printed object may be reduced. The flow of solvent over the 3D printed object may also be controlled, for example, using a fan to control the extent of interaction between the solvent and the surface of the 3D printed object. For example, where contact between the solvent vapour and the 3D printed object takes place in a chemical polishing chamber, the chemical polishing chamber may be provided with a fan to control the flow of vapour and air within the chemical polishing chamber.

Once treated with the solvent, the 3D printed object may have a surface roughness of less than about 6 Ra (μm). In some examples, the 3D printed object may be treated with solvent to reduce the surface roughness of the 3D printed object to less than about 5 Ra (μm), for instance, less than about 4 Ra (μm). In some examples, the surface roughness may be reduced to values of about 0.25 to about 5 Ra (μm), for example, about 0.5 to about 4 Ra (μm) or about 1 to about 3 Ra (μm). In some examples, the surface roughness may be reduced to values of about 1 to about 2 Ra (μm). The final surface roughness may be tailored depending on, for example, the end use of the 3D printed object. Alternatively, the final surface roughness may be tailored depending on, for example, the nature of the finish intended to be applied to the 3D printed object (e.g. paint or metallization).

Prior to treatment with the solvent, the 3D printed object may have a first Young's modulus. Where measured, Young's modulus may be measured using any suitable method. For example, Young's modulus may be measured using ASTM-D638 and/or ISO 527-2. In one example, the Young's modulus of the 3D printed object may be determined by applying a tensile or compressive force to the sample and determining the corresponding strain of the sample under stress. The stress to strain ratio may be determined to obtain the Young's modulus. The ratio may be determined in, for example, a selected range of tensile or compressive stress. For example, the ratio may be determined in a tensile or compressive stress range of about 1 to about 50%, for instance, 3 to 25%. The measurements may be carried out using a universal testing machine (e.g. Instron 5969), for example, at tensile or compressive rates of about 1 to about 500 mm/min until the sample yields or breaks.

The sample may be subjected to multiple load cycles and the Young's modulus may be determined after a predetermined number of cycles.

It may be possible to determine the Young's modulus of the 3D printed object before treatment with the solvent and after the solvent has been selectively removed. However, it may not be necessary for the Young's modulus to be determined. For example, once it has been established (e.g. through preliminary experiments) that the selective removal of solvent under certain conditions alters the Young's modulus of the 3D printed object in a particular manner, then the same or similar protocol may be used to newly printed 3D printed objects without any measurement of Young's modulus taking place. The Young's modulus may be controlled by selective removal of the solvent without requiring the Young's modulus to be determined on the part in question.

As printed, the 3D printed object may have a first Young's modulus. The difference between the target Young's modulus and the first Young's modulus may be at least about 2%. In some examples, the difference between the target Young's modulus and the first Young's modulus may be at least about 3% for instance, at least about 4%, at least about 5% or at least about 6%. In some examples, the difference between the target Young's modulus and the first Young's modulus may be at least about 7% for instance, at least about 8% or at least about 10%. In some examples, the difference between the target Young's modulus and the first Young's modulus may be about 2 to about 20%, for instance, about 3 to about 18%, about 4 to about 15%. In some examples, the difference between the target Young's modulus and the first Young's modulus may be about 5 to about 10%.

In some instances, the target Young's modulus may be lower than the first Young's modulus. The target Young's modulus may be lower than the first Young's modulus by at least about 2%. In some examples, the difference between the target Young's modulus and the first Young's modulus may be at least about 3% for instance, at least about 4%, at least about 5% or at least about 6%. In some examples, the target Young's modulus may be lower than the first Young's modulus may be at least about 7% for instance, at least about 8% or at least about 10%. In some examples, the difference between the target Young's modulus and the first Young's modulus may be about 2 to about 20%, for instance, about 3 to about 18%, about 4 to about 15%. In some examples, the difference between the target Young's modulus and the first Young's modulus may be about 5 to about 10%.

In other instances, the target Young's modulus may be higher than the first Young's modulus. The target Young's modulus may be higher than the first Young's modulus by at least about 2%. In some examples, the difference between the target Young's modulus and the first Young's modulus may be at least about 3% for instance, at least about 4%, at least about 5% or at least about 6%. In some examples, the target Young's modulus may be higher than the first Young's modulus may be at least about 7% for instance, at least about 8% or at least about 10%. In some examples, the difference between the target Young's modulus and the first Young's modulus may be about 2 to about 20%, for instance, about 3 to about 18%, about 4 to about 15%. In some examples, the difference between the target Young's modulus and the first Young's modulus may be about 5 to about 10%.

The Young's modulus may be controlled by selectively removing the solvent from the 3D printed object. For example, the time and/or temperature at which the 3D printed object may be varied to selectively remove solvent from the 3D printed object. Lengthening the heating time and/or increasing the heating temperature may reduce the amount of residual solvent in the 3D printed object.

In some examples, the residual solvent level may be controlled above a threshold. Where the residual solvent is above a threshold, the Young's modulus of the 3D printed object may be increased relative to the Young's modulus of the 3D printed object prior to treatment with the solvent. Without wishing to be bound by any theory, the residual solvent may have plasticizing characteristics that may reduce the stiffness of the 3D printed object.

In some examples, the residual solvent may be controlled below a threshold. Where the residual solvent is below a threshold, the Young's modulus of the 3D printed object may be lowered relative to the Young's modulus of the 3D printed object prior to treatment with the solvent. In some examples, the residual solvent levels are controlled below a threshold by heating the 3D printed object for a predetermined length of time and/or at a predetermined temperature. Without wishing to be bound by any theory, the time and/or temperature of the heating step may cause the material of the 3D printed object to interact with the solvent in a manner that stiffens the material of the 3D printed object., for example, as a function of plasticization and/or subsequent solvent removal.

The Young's modulus of the 3D object may be controlled within a target value by selectively removing at least part of the solvent from the 3D printed object, such that the 3D printed object contains about 0.1 to about 10 mg/cm$^2$ of residual solvent. In some examples, the amount of residual solvent may be about 0.2 to about 5 mg/cm$^2$, for instance, about 0.5 to about 3 mg/cm$^2$ of residual solvent.

Where the 3D printed object is contacted with the solvent in a chamber, for example, a chemical polishing chamber, selective removal of the solvent may also be performed in the chemical polishing chamber. This may be performed by heating the chamber and/or controlling the temperature and/or duration of heating.

Powder Bed Material

As discussed above, the 3D printed object may be formed from a powder bed material. The powder bed material may be in the form of particles or powder.

The particles may have an average particle size of at least about 10 μm, for example, at least about 15 μm, at least about 20 μm, at least about 30 μm, at least about 40 μm or at least about 50 μm. The particles may have an average particle size of at most about 120 about, for example, at most about 110 μm, at most about 100 μm, at most about 90 μm, at most about 80 μm or at most about 75 μm.

In some examples, the powder bed material may have an average particle size of from about 10 to about 120 μm, for example, about 15 to about 110 μm. In some examples, the powder bed material may have an average particle size of from about 20 to about 100 μm, about 30 to about 90 μm, about 40 to about 80 μm or about 50 to about 75 μm. As used in the present disclosure, "average" with respect to properties of particles refers to a volume average unless otherwise specified. Accordingly, "average particle size" refers to a volume average particle size. Additionally, "particle size" refers to the diameter of spherical particles, or to the longest dimension of non-spherical particles. Particle size may be determined by any suitable method, for example, by laser diffraction spectroscopy.

The volume-based particle size distribution of the powder bed material may be as follows: D50 can be from about 45 μm to about 75 μm, from about 55 μm to about 65 μm, or about 60 μm; D10 can be from about 20 μm to about 50 μm, from about 30 μm to about 40 μm, or about 35 μm; and D90 can be from about 75 μm to about 100 μm, from about 80 μm to about 95 μm, or about 90 μm. "D50" is defined as the median particle diameter (by volume). "D10" is defined as the tenth-percentile by volume of powder that is below a given particle size, e.g., from about 20 μm to about 50 μm. "D90" is defined as the ninetieth-percentile by volume of powder that is below a given particle size, e.g., about 75 μm to about 100 μm.

In one example, the particle size distribution of the powder bed material may be as follows:

a. D50 is from about 45 μm to about 70 μm, b. D10 is from about 20 μm to about 50 μm, and c. D90 is from about 75 μm to about 100 μm.

In certain examples, the particles of the powder bed material can have a variety of shapes, such as substantially spherical particles or irregularly-shaped particles. In some examples, the particles can be capable of being formed into 3D printed parts with a resolution of about 10 to about 120 μm, for example about 20 to about 100 μm or about 20 to about 80 μm. As used herein, "resolution" refers to the size of the smallest feature that can be formed on a 3D printed part. The particles can form layers from about 10 to about 120 μm or 100 μm thick, allowing the fused layers of the printed part to have roughly the same thickness. This can provide a resolution in the z-axis direction of about 10 to about 100 μm. The particles can also have a sufficiently small particle size and sufficiently regular particle shape to provide about 10 to about 100 μm resolution along the x-axis and y-axis.

The particle size and/or geometry of the powder bed material may be selected to provide the 3D printed object with a microstructure, for example, a porosity at the surface of the 3D printed object that may facilitate penetration of the solvent into the 3D printed object.

The powder bed material may comprise a polymer. The polymer can have a melting or softening point from about 70° C. to about 350° C. In further examples, the polymer can have a melting or softening point from about 150° C. to about 200° C.

The powder bed material may comprise a thermoplastic polymer, for example, a thermoplastic elastomer. Examples of suitable thermoplastic elastomers include styrene block copolymers, olefinic thermoplastic elastomers, thermoplastic vulcanizates, thermoplastic polyurethanes, thermoplastic copolyesters and thermoplastic polyamides. In some examples, the powder bed material comprises thermoplastic polyamide and/or thermoplastic polyurethane.

The powder bed material may also include an anti-oxidant. The anti-oxidant can be sterically hindered phenol derivatives. The anti-oxidant can, for example be in the form of fine particles, e.g., 5 μm or less, that are e.g. dry blended with the remaining particles of the powder bed material. The anti-oxidant may be present at a concentration of at least about 0.01 wt %, for example, at least about 0.05 wt %, at least about 0.1 wt % or at least about 0.2 wt %. The anti-oxidant may be present at a concentration of at most about 2 wt %, for example, at most about 1.5 wt % or at most about 1 wt %. In some examples, the anti-oxidant may be present in an amount of e.g., from about 0.01 wt % to about 2 wt % or from about 0.2 wt % to about 1 wt % of the powder bed material.

The powder bed material can, in some cases, also comprise a filler. The filler can include inorganic particles such as alumina, silica, glass, and/or other similar fillers. In some examples, the filler can include a free-flow filler, anti-caking filler, or the like. Such fillers can prevent packing of the powder bed material, and/or coat the particles of the powder bed material and smooth edges to reduce inter-particle friction, and/or absorb moisture. In some examples, a weight ratio of polymer to filler particles in the powder bed material can be from about 99:1 to about 1:2, from about 10:1 to about 1:1, or from about 5:1 to about: 1.

Fusing Agents

As explained above, the 3D printed object may be formed by coalescing particles of powder bed material to form a layer of the 3D printed object. Fresh powder bed material may be applied to the layer of the 3D printed object and the freshly applied powder bed material may be coalesced to form a further layer of the 3D printed object. The procedure may be repeated layer-by-layer until the 3D printed object is formed.

The powder bed material may be formed by selectively applying a fusing agent comprising a radiation absorber in a liquid carrier to regions of the powder bed material. When the radiation absorber is exposed to selected wavelengths of electromagnetic radiation, the radiation absorber may absorb the electromagnetic radiation and generate thermal energy. The thermal energy generated may cause powder bed material in contact with the radiation absorber to coalesce, thereby forming a layer of the 3D printed object.

The fusing agent may be applied to form a microstructure, for example, a porous microstructure at least at the surface of the 3D printed object. This microstructure may facilitate penetration of the solvent into the 3D printed object in the subsequent chemical polishing procedure. The microstructure may be controlled by varying, for example, the print density of the fusing agent.

The fusing agent may be applied according to a 3D printed object model. The 3D object model may comprise at least one of: a 3D object model created using Computer Aided Design (CAD) or similar software; or a file, for example, a Standard Tessellation Language file generated based on output of the CAD software, providing one or more processors of a 3D printer with instructions to form the 3D object Where a fusing agent is employed, the fusing agent may include a radiation absorber or pigment that can absorb electromagnetic radiation and convert that radiation into heat. The fusing agent can be selectively applied to areas of the powder bed material that are intended to be consolidated to become part of the solid 3D printed object.

The fusing agent can be applied, for example, by printing with an inkjet printhead. Accordingly, the fusing fluid can be applied with precision to selected areas of the powder bed material to form a layer of the 3D printed object. After applying the fusing agent, the powder bed material can be irradiated with electromagnetic radiation. The radiation absorber can absorb this energy and convert it to heat, thereby heating any powder bed material particles in contact with the radiation absorber of the fusing agent. This heat can consolidate the particles into a solid layer. The powder bed material that is not printed with the fusing agent can remain as a relatively loose powder.

The process of forming a single layer by applying fusing agent and bed of powder bed material can be repeated with additional layers of fresh powder bed material to form additional layers of the 3D printed object. This can allow the final 3D printed object to be built one layer at a time.

In the printing process, the powder bed material surrounding the 3D printed object can act as a support material for the object. When the 3D printing is complete, the object can be removed from the bed and any loose powder bed material on the object can be removed.

The radiation absorber of the fusing agent may be any suitable absorber. Examples of suitable absorbers include UV absorbers, infrared absorbers and near infrared absorbers. In some examples, infrared absorbers or near infrared absorbers are employed. In some examples, the infrared absorber or near infrared absorber may absorb electromagnetic radiation in the range of 700 nm to 1 mm. In many cases, the infrared absorber or near infrared absorber can have a peak absorption wavelength in the range of 800 nm to 1400 nm.

In some examples, the absorber can be carbon black, tungsten bronze, molybdenum bronze, conjugated polymer, aminium dye, tetraaryldiamine dye, cyanine dye, phthalocyanine dye, dithiolene dye, metal phosphate, metal silicate or mixtures thereof.

The absorber may be a near infrared absorbing dye. Examples of absorbing dyes include aminium dyes, tetraaryldiamine dyes, cyanine dyes, pthalocyanine dyes, dithiolene dyes, and others.

In further examples, the absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds.

Other examples of radiation absorbers or pigments can include phosphates having a variety of counterions such as copper, zinc, iron, magnesium, calcium, strontium, the like, and combinations thereof. Specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable radiation absorbers.

Other examples of radiation absorbers or pigments include silicates. The silicates can have the same or similar counterions as the phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable pigments.

In some examples, the absorber may comprise carbon black.

The 3D printed object may comprise greater than about 0 to about 100 ng per g of the 3D printed object. For example, the 3D printed object may comprise greater than about 0 to about 50 ng of radiation absorber per gram the 3D printed object, for instance, greater than about 0 to about 30 ng per g of the 3D printed object, or greater than about 0 to about 20 ng per g of the 3D printed object. In some instances, the amount of radiation absorber may be greater than about 0 to about 15 ng per g of the 3D printed object, for example, greater than about 0 to about 13 ng per g or greater than about 0 to about 3 ng per g.

In some examples, the radiation absorber, may be dissolved or dispersed in a liquid vehicle. The fusing agent may be a liquid composition comprising the radiation absorber, e.g. UV absorber, near infrared absorber or infrared absorber and a liquid carrier.

The liquid carrier can include water. In some examples, an additional co-solvent may also be present. In certain examples, a high boiling point co-solvent can be included in the fusing agent. The high boiling point co-solvent can be an organic co-solvent that boils at a temperature higher than the temperature of the bed of powder bed material during printing. In some examples, the high boiling point co-solvent can have a boiling point above 250° C. In still further examples, the high boiling point co-solvent can be present at a concentration of at least about 1 wt %, for example, at least about 1.5 wt % of the total weight of the fusing agent. The co-solvent, where employed may be present in an amount of at most about 50 wt %, for example, at most 40 wt %, at most 35 wt % or at most 30 wt %. In some examples, the co-solvent may be present in an amount of from about 1 wt % to about 40 wt % of the total weight of the fusing agent.

Classes of co-solvents that can be used in the fusing agent can include organic co-solvents including aliphatic alcohols, aromatic alcohols, diols, glycol ethers, polyglycol ethers, caprolactams, formamides, acetamides, and long chain alcohols. Examples of such co-solvents may include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of co-solvents that can be used include 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

A surfactant, or combination of surfactants, can also be present in the fusing agent. Examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Other surfactants can include liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

The amount of surfactant present in the fusing agent may range from about 0.01 wt % to about 20 wt %.

Various other additives can be employed to optimize the properties of the fusing agent for specific applications. Such additives can be present at from about 0.01 wt % to about 20 wt % of the fusing agent. Examples of these additives are those added to inhibit the growth of harmful microorganisms. These additives may be biocides, fungicides, and other microbial agents, which can be used in ink jet formulations. Examples of suitable microbial agents include NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities. Buffers may also be used to control the pH of the composition. Viscosity modifiers may also be present.

The amount of radiation absorber, e.g. UV absorber, infrared absorber or near infrared absorber, in the fusing agent can vary depending on the type of absorber. In some examples, the concentration of infrared absorber or near infrared absorber in the fusing agent can be from about 0.1 wt % to about 20 wt % of the fusing agent. In one example, the concentration of absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %.

The fusing agent can have a temperature boosting capacity. In the case of a polymer powder bed material, this temperature boosting capacity may be used to increase the temperature of the polymer in the bed of powder bed material above the melting or softening point of the polymer. As used herein, "temperature boosting capacity" refers to the ability of a fusing agent to convert electromagnetic radiation, for example, infrared or near-infrared energy into thermal energy. When fusing agent is applied to the powder bed material (e.g. by printing), this temperature boosting capacity can be used to increase the temperature of the treated (e.g. printed) portions of the powder bed material over and above the temperature of the untreated (e.g. unprinted) portions of the powder bed material. The particles of the powder bed material can be at least partially bound or coalesced when the temperature increases to or above the melting point of the polymer.

As used herein, "melting point" refers to the temperature at which a polymer transitions from a crystalline phase to a pliable, amorphous phase. Some polymers do not have a single melting point, but rather have a range of temperatures over which the polymers soften. When the fusing agent is selectively applied to at least a portion of the polymer powder, the fusing agent can heat the treated portion to a temperature at or above the melting or softening point, while the untreated portions of the polymer powder remain below the melting or softening point. This allows the formation of a solid 3D printed part, while the loose powder can be easily separated from the finished printed part.

In one example, the fusing agent can have a temperature boosting capacity from about 10° C. to about 70° C. for a polymer with a melting or softening point of from about 100° C. to about 350° C. If the powder bed is at a temperature within about 10° C. to about 70° C. of the melting or softening point, then such a fusing agent can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing agent can then be applied (e.g. printed) onto the powder and the powder bed can be irradiated with e.g. infrared or near-infrared light to coalesce the treated (e.g. printed) portion of the powder.

Detailing Agents

In some examples, a detailing agent may be used during printing of the 3D printed object. The detailing agent can be capable of reducing the temperature of the powder bed material onto which the detailing agent is applied. The detailing agent can increase selectivity between the fused and unfused or partially unfused portions of the powder bed by reducing the temperature of the powder around the edges of the portion to be fused. Thus, the detailing agent can be used to create porosity within the 3D printed object. For example, the detailing agent may be applied to selected regions to which fusing agent has been applied to reduce the extent of fusing in the detailing agent-treated regions. By reducing the extent of fusing, porosity may be introduced into the 3D printed part. In some examples, the fusing agent and detailing agent may be selectively applied in combination to provide the porous region.

In some examples, the detailing agent can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof.

Examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof.

In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers.

That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the electromagnetic radiation or radiation energy.

The detailing agent can also include ingredients to allow the detailing agent to be jetted by a ink jet printhead. In some examples, the detailing agent can include additives such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above in relation to the fusing agent.

Manufacturing the 3D Printed Object

Figure 2:
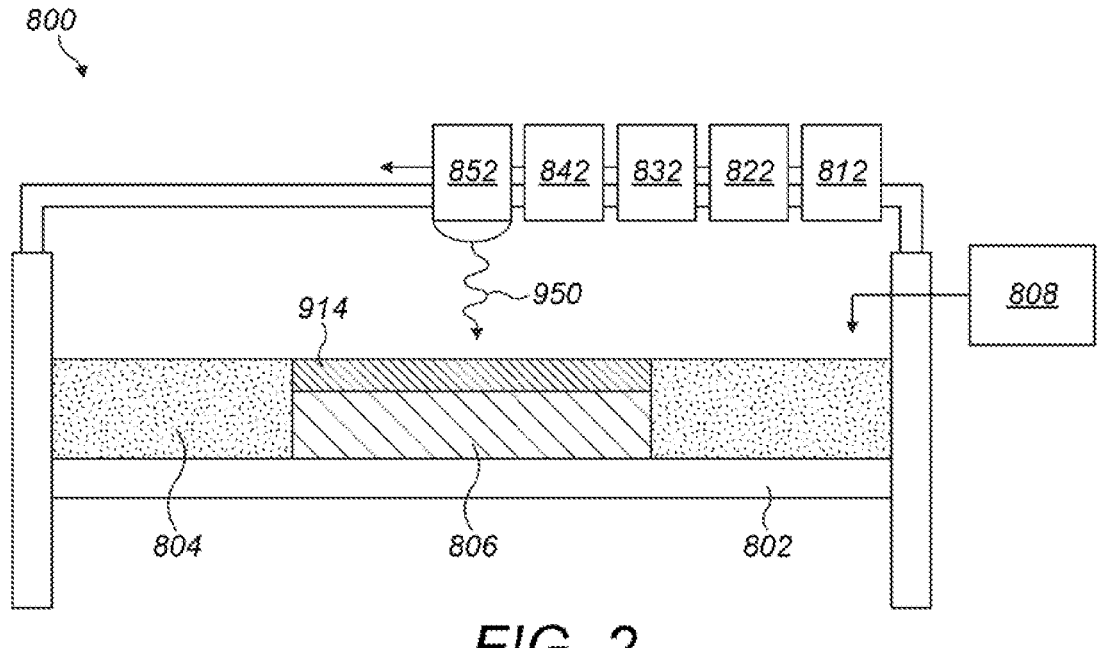
Figure 3:
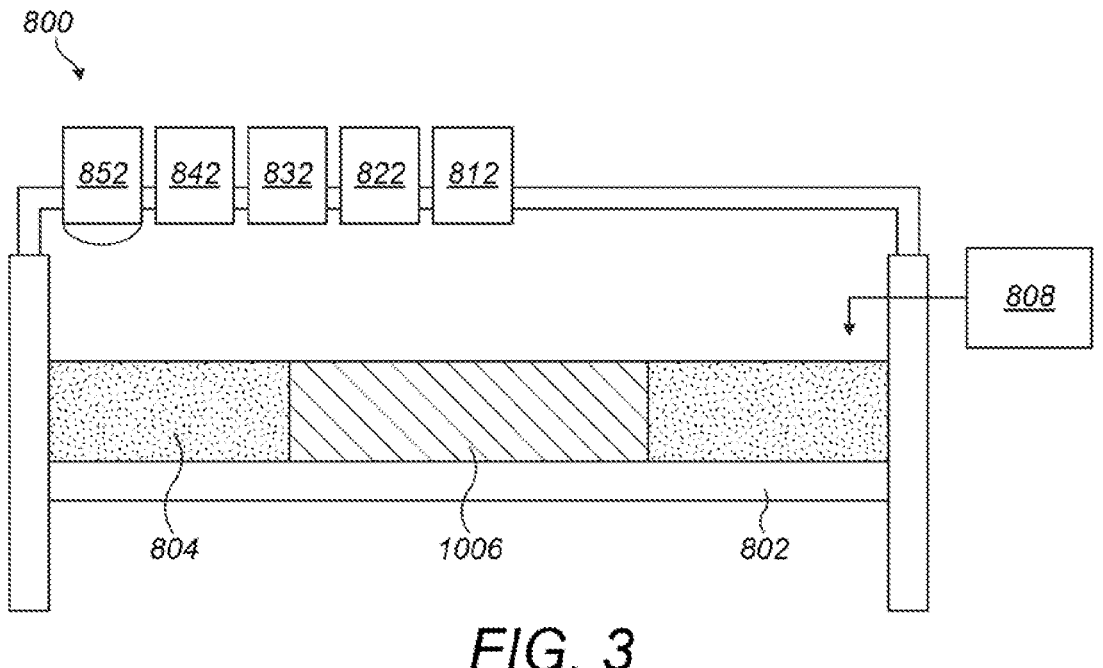

FIGS. 1-3 illustrate one example method of making a 3D printed object. FIG. 1 shows a 3D printing system 800 that includes a build platform 802 supporting powder bed material 804. A partially printed object 806 is made up of fused powder bed material in the powder bed. This figure shows a cross-sectional view of the partially printed article and the powder bed. A layer of fresh powder bed material is supplied over the top of the partially printed object from a powder bed material supply 808. Fluids (e.g. inkjet inks) are applied to the layer of fresh powder bed material, including fusing agent 810 from fusing agent jets 812, 832, 842, and a detailing agent 820 from jet 822. The fluid jets are moveable within the printing system so that the fluid jets can move across the powder bed to apply the fluids in specific, desired locations. The system also includes an electromagnetic energy source 852.

FIG. 2 shows the 3D printing system 800 after the fluids have been jetted onto portions of the powder bed material 804. An upper layer of build material includes areas jetted with fusing agent 810. These agents are selectively applied to produce an architecture or structure that, for example, comprises pores and a surface roughness, Ra, of at least about 5 μm. As explained above, the porosity can be produced by controlling the amount and print density of the fusing agent and/or detailing agent to control the degree of fusing of the powder bed particles in the porous region.

The porosity of the 3D printed object may be controlled, such that the 3D printed object has pores that are at least about 2 μm, at least about 5 μm or at least about 10 μm. The pores may be at most about 200 μm, for example, at most about 150 μm or about 100 μm. The pores may be about 2 to about 200 μm, for example, about 5 to about 150 μm or about 10 to about 100 μm.

FIG. 3 shows the 3D printing system 800 after fusing the upper layer to form a 3D printed object 1006. Fusing can be carried out by exposing the powder bed to electromagnetic energy 950 from an energy source 852, such as an infrared lamp. Once fused, the object 1006 can be removed from the powder bed.

Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure used to fuse individually printed layer. The fusing lamp can be configured to irradiate the entire powder bed with a substantially uniform amount of energy. This can selectively fuse the portions printed with the fusing agent while leaving the unprinted portions of the polymer powder below the fusing temperature. The extent of fusing may also be controlled by controlling the amount and print density of fusing agent and/or selectively cooling portions of the bed that have been treated with fusing agent using a detailing agent.

By controlling the extent of fusing, complete fusing or solidification of the powder bed particles can be avoided in selected parts, thereby providing porosity in selected regions of the 3D printed object.

In one example, the fusing lamp can be matched with the radiation absorber in the fusing agent so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the polymer particles with the fusing agent printed thereon, while the unprinted polymer particles do not absorb as much light and remain at a lower temperature.

In some examples, the three-dimensional printing system can also include preheaters for preheating the polymer powder to a temperature near the fusing temperature. In one example, the system can include a print bed heater to heat the print bed during printing. The preheat temperature used can depend on the type of polymer used. In some examples, the print bed heater can heat the print bed to a temperature from about 50° C. to about 250° C. The system can also include a supply bed, where polymer particles can be stored before being spread in a layer onto the print bed. The supply bed can have a supply bed heater. In some examples, the supply bed heater can heat the supply bed to a temperature from about 80° C. to about 140° C.

Depending on the amount of radiation absorber present in the polymer powder, the absorbance of the radiation absorber, the preheat temperature, and the fusing temperature of the polymer, an appropriate amount of irradiation can be supplied from the electromagnetic energy source or fusing lamp. In some examples, the fusing lamp can irradiate individual layers from about 0.1 to about 10 seconds per pass. In further examples, the fusing lamp can move across the powder bed at a rate of about 2.5 cm per second to about 130 cm per second to fuse the individual layers. In still further examples, the fusing lamp can move across the powder bed at a rate of about 15 cm per second to about 50 cm per second.

Once the printing process is complete and the 3D printed object formed, it can be removed and cleaned.

Figure 4:
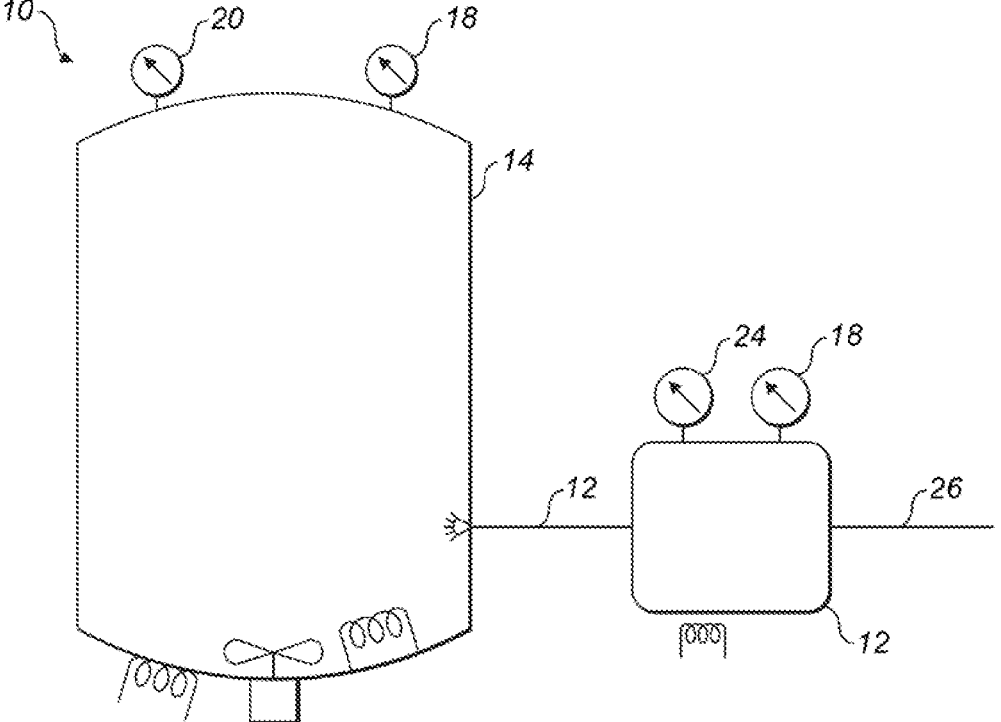
FIG. 4 is a schematic drawing of an apparatus that can be used in an example method of the present disclosure.

Once removed, the 3D printed object may be subjected to chemical polishing. FIG. 4 is a schematic illustration of apparatus 10 that may be used to chemically polish the 3D printed object.

The apparatus 10 comprises a vaporization chamber 12 and a chemical polishing chamber 14. The vaporization chamber 12 may be coupled to a source of liquid solvent (not shown) via line 26. The vaporization chamber 12 may comprise a heater, pressure gauge 22 and temperature gauge 24. The vaporization chamber 12 may be coupled to the chemical polishing chamber 14 via line 16.

The chemical polishing chamber 14 may comprise heater(s), a pressure gauge 18 and a temperature gauge 20. The chemical polishing chamber 14 may also comprise a fan for circulating vapour flow within the chemical polishing chamber 14. The chemical polishing chamber may comprise a stand (not shown) on to which the 3D printed object may be placed during treatment.

In use, a liquid solvent, for example, hexafluoroisopropanol may be introduced into the vaporization chamber 12 via line 26. In the vaporization chamber 12, the solvent may be heated. The pressure of the vaporization chamber may be controlled to a pressure of, for example, about 0.4 MPa (4 bar) to about 0.5 bar (5 bar). The temperature within the vaporization chamber may be elevated, for example, from about 80 to about 150 degrees C. Where the pressure is, for example, about 0.4 MPa, the temperature may be about 80 to 100 degrees C. Where the pressure is, for example, about 0.5 MPa, the temperature may be about 130 to about 150 degrees C.

The solvent vapour may then be introduced into the chemical polishing chamber 12. Prior to introduction of the solvent vapour, the 3D printed object may be placed in the chemical polishing chamber 12 and the pressure within the chamber 12 reduced. In one example, the chemical polishing chamber may be evacuated to less than about 50 mbar, for instance, about 30 mbar. The solvent vapour may then be introduced into the chemical polishing chamber 12 to bring the pressure to about 300 to 800 mbar. A fan may be used within the chemical polishing chamber 12 to control the flow of vapour over the 3D printed object.

The amount of solvent introduced, the pressure and/or temperature of the chamber 12 may be varied to ensure condensation of the solvent vapour onto the 3D printed object. The contact time between the condensed solvent film and the 3D printed object may also be controlled to target the final surface roughness, Ra, of the 3D printed object at about 0.5 to about 4.0 μm. As discussed above, the final roughness may be adapted to facilitate adhesion of the surface to a subsequently applied coating.

The amount of solvent introduced into the chemical polishing chamber 12 may also depend on the surface area of the 3D printed object. In one example, about 100 to about 1000 ml of solvent (e.g. hexafluoroisopropanol) is employed for surface areas of about 1000 to about 10,000 cm$^2$. In one example, about 200 to aout 350 mL of solvent (e.g. hexafluoroisopropanol) is employed for surface areas from about 1,500 to about 4,000 cm$^2$.

Once the target surface roughness has been achieved and/or target contact time reached, the solvent may be removed from the surface of the 3D printed object. Solvent removal may be achieved by heating the 3D printed object within the chemical polishing chamber 12. The removed solvent may be condensed and re-used (not shown).

As discussed above, solvent removal may be controlled to control the Young's Modulus of the treated 3D printed object.

EXAMPLES

Latticed objects measuring 80×80×20 mm was formed by printed from thermoplastic polyamide powder bed material and carbon black using the 3D printing process described above.

The objects were then treated with hexafluoroisopropanol. Hexafluoroisopropanol was heated in a vaporization chamber to vaporize the solvent. The vaporization chamber was pressurized to a pressure of about 0.4 MPa (4 bar) and heated to temperatures of about 80 to 100 degrees C. The solvent vapour was then contacted with a 3D printed latticed object in a chemical polishing chamber. Prior to injection of the solvent vapour, the pressure of the chemical polishing chamber was about 20 mbar but this was brought to about 300 mbar upon injection of the vapour. The solvent vapour condensed to form liquid film of the solvent to form on the outer surface of the latticed object. The liquid film dissolved part of the polymer on the outer surface of the latticed object, reducing the surface roughness of the object.

The solvent was then selectively removed by heating the latticed object in the chemical polishing chamber at 120 degrees C. for periods of 1 h (Samples A), 1.5 h (Samples B), 2 h (Samples C) and 3 h (Samples D), respectively.

The Young's modulus of each object was measured before contact with the solvent and after selective solvent removal using the Universal Testing System, Instron® 5969, where samples are preloaded with 2N prior to testing. Afterwards samples were submitted to 40% of compressive strain at 500 mm/min. The test is performed 10 times, each cycle consisting in a compression followed by decompression. The compressive strain vs load curves for the samples were determined and the Young Modulus calculated at the $10^{th}$ cycle for the 3-25% compressive strain range.

The results are shown in the table below. The amount of residual solvent after selective solvent removal was also determined.

| Sample | Drying Time (h) | Mean Young's modulus | Mean trapped HFIP solvent after drying (mg/cm²) |
|---|---|---|---|
| A | As printed | 1.55 | |
| | 1 h | 1.39 | 2.62 |
| B | As printed | 1.45 | |
| | 1.5 h | 1.52 | 1.38 |
| C | As printed | 1.41 | |
| | 2 h | 1.48 | 0.71 |
| D | As printed | 1.43 | |
| | 3 h | 1.51 | 0.65 |

Definitions

It is noted that, as used in this specification and the appended claims, the singular forms "a," "an," and "the" include plural referents unless the content clearly dictates otherwise.

As used herein, the term "about" is used to provide flexibility to a range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each individual member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if the numerical value and sub-range is recited. For example, a weight ratio range of about 1 wt % to about 20 wt % should be interpreted to include the explicitly recited limits of 1 wt % and about 20 wt %, and also to include individual weights such as 2 wt %, 11 wt %, 14 wt %, and sub-ranges such as 10 wt % to 20 wt %, 5 wt % to 15 wt %, etc.

The surface roughness, Ra, is the arithmetical mean roughness value, wherein the arithmetical mean of the absolute values of the profile deviations from the mean line of the roughness profile is measured. Ra may be measured according to any suitable method. An example of a suitable method is ISO 4287:1997.

The invention claimed is:

1. A method of chemical polishing a 3D printed object, said method comprising:
    treating a 3D printed object with solvent to reduce the surface roughness of the 3D printed object by contacting the 3D printed object with solvent vapor and condensing the vapor on the 3D printed object; and
    controlling the Young's modulus of the 3D printed object within a target value by selectively removing at least part of the solvent from the 3D printed object by heating the 3D printed object at 120° C. for a period of time ranging from 1 hour to 3 hours, such that the 3D printed object contains 0.5 mg/cm² to 3 mg/cm² of residual solvent.

2. The method as claimed in claim 1, wherein the solvent is selected from at least one of ethanol, propanol, isopropanol, butanol glycol glycerol, benzyl alcohol, chlorobenzene, triethylene glycol, 2,2,2-trifluoroethanol, hexafluoroisopropanol.

3. The method as claimed in claim 1, wherein, prior to treatment, the 3D printed object has a first Young's modulus and the difference between the target Young's modulus and the first Young's modulus is at least 2%.

4. The method as claimed in claim 3, wherein the difference between the target Young's modulus and the first Young's modulus is at least 4%.

5. The method as claimed in claim 1, wherein, prior to treatment, the 3D printed object has a first Young's modulus and the target Young's modulus is lower or higher than the first Young's modulus.

6. The method as claimed in claim 1, wherein the 3D printed object is treated with solvent to reduce the surface roughness of the 3D printed object to less than 4 Ra (μm).

7. The method as claimed in claim 1, wherein the 3D printed object is treated with the solvent in a chamber, and wherein the Young's modulus of the 3D printed object is controlled within the target value by selectively removing at least part of the solvent from the 3D printed object in the same chamber.

8. The method as claimed in claim 1, which further comprises applying a dye to the 3D printed object.

9. The method as claimed in claim 1, wherein the 3D printed object comprises a thermoplastic elastomer selected from at least one of styrene block copolymers, olefinic thermoplastic elastomers, thermoplastic vulcanizates, thermoplastic polyurethanes, thermoplastic copolyesters and thermoplastic polyamides.

10. The method as claimed in claim 1, wherein the 3D printed object comprises a radiation absorber.

11. The method as claimed in claim 1, wherein the 3D printed object is produced by:
    selectively applying a fusing agent to portions of a layer of powder bed material, wherein the fusing agent comprises a radiation absorber and a liquid carrier; and
    irradiating the selectively applied fusing agent to generate thermal energy to coalesce the powder bed material to form a layer of the 3D printed object.

12. The method as claimed in claim 11, wherein the fusing agent is selectively applied and/or a detailing agent is selectively applied to form a microstructure at the surface of the 3D printed object that facilitates penetration of the solvent.

\*   \*   \*   \*   \*